United States Patent
Carter et al.

(10) Patent No.: US 8,095,803 B1
(45) Date of Patent: Jan. 10, 2012

(54) PROTECTING THE PRIVACY OF FILES REFERENCED BY THEIR HASH

(75) Inventors: Richard J. Carter, Los Altos, CA (US);
Mark S. Miller, Sunnyvale, CA (US);
Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1341 days.

(21) Appl. No.: 11/684,534

(22) Filed: Mar. 9, 2007

(51) Int. Cl.
*G06F 11/30* (2006.01)
*G06F 12/14* (2006.01)

(52) U.S. Cl. ............ 713/193; 713/181; 713/150; 726/1; 726/4; 707/206; 707/698; 707/747; 707/749

(58) Field of Classification Search .................. 713/150, 713/181, 193; 726/1, 4; 707/698, 747, 749, 707/206
See application file for complete search history.

(56) References Cited

U.S. PATENT DOCUMENTS

| | | | |
|---|---|---|---|
| 5,754,844 A * | 5/1998 | Fuller ................................ | 1/1 |
| 6,279,007 B1 * | 8/2001 | Uppala ............................. | 1/1 |
| 6,594,665 B1 * | 7/2003 | Sowa et al. ..................... | 1/1 |
| 6,625,592 B1 * | 9/2003 | Dyer et al. ...................... | 1/1 |
| 7,730,523 B1 * | 6/2010 | Masurkar ...................... | 726/4 |
| 2005/0204141 A1 * | 9/2005 | Sayers et al. ................. | 713/181 |
| 2006/0112264 A1 * | 5/2006 | Agarwal ...................... | 713/150 |
| 2008/0098236 A1 * | 4/2008 | Pandey et al. ................ | 713/189 |

* cited by examiner

*Primary Examiner* — Edan Orgad
*Assistant Examiner* — Kari Schmidt

(57) ABSTRACT

A storage manager provides data privacy, while preserving the benefits provided by existing hash based storage systems. Each file is assigned a unique identifying code. Hashes of the content-derived chunks of the file are calculated based on the content of the chunk and the code identifying the file. When a request to store a chunk of data is received, it is determined whether a chunk associated with the hash has already been stored. Because hashes are based on privacy-preserving codes as well as content, chunks of duplicate copies of a file need not be stored multiple times, and yet privacy is preserved for content at a file level. In other embodiments, hashes indicating whether a given file is public and/or indicating the identity of the requesting user are also sent with storage requests. These additional hashes enable more robust transmission and storage efficiency, while still preserving privacy.

13 Claims, 5 Drawing Sheets

PROTECTING THE PRIVACY OF FILES REFERENCED BY THEIR HASH

TECHNICAL FIELD

This invention pertains generally to electronic information storage systems, and more specifically to protecting the privacy of files referenced by their hash within a storage system.

BACKGROUND ART

Many electronic information storage systems store files by first breaking them up into blocks called "chunks" based on their contents, and then storing only one copy of each identical chunk. This process of not storing duplicate copies of identical chunks achieves various storage efficiencies, as a file system typically includes a lot of duplicate content. Importantly, the system identifies identical chunks by comparing a cryptographic hash of the contents of the chunks. A client of the storage system that desires to write a file first communicates only the hashes of the chunks of the file to be written. The storage system responds by requesting the full contents of the chunks that are not already stored, again based solely on a comparison of hash values. Although in theory this system would fail to preserve data integrity when two different chunks hash to the same value (a "hash collision"), the probability of such a collision is so small as to be deemed virtually impossible. This approach of communicating hashes cuts down on the communication bandwidth used between the storage system and its clients during file write operations. Thus, this type of system has the advantages of reduced storage overhead and communication bandwidth when compared with other types of systems, and operates well in the domain of archival storage systems, where the interaction with the system is only through well controlled client software. However, moving this type of system into the domain of general file systems exposes a problem of data privacy.

One might assume that such a system, which uses collision-free one-way hash values to effectively name its file chunks, is immune to a data privacy attack. However, a user of the system who can guess the contents of another user's file chunk can determine if a chunk with that content exists in the system. The simplest mechanism would involve a read request that specifies the hash of the guessed contents. If the storage system has that chunk, it will respond with the data, otherwise with an error. If the storage system provides an access control mechanism to prevent such read probing, two write-based attacks are still possible. The first write-based attack involves attempting a write of the guessed chunk, and then observing whether the system requests the full chunk contents. If that low-level interface to the storage system is not available to the user, simply timing the storage of the guessed chunk would indicate whether or not it is already present on the system. Clearly, being able to guess a limited set of possibilities for the contents of a file is not uncommon. Being able to confirm the actual content from such a guessed set would be useful to an adversary.

For example, a file may consist of the simple message "The attack starts at dawn." An adversary can create files with the messages "The attack starts at midnight.", "The attack starts at noon.", and "The attack starts at dawn." Probing the file system with the hashes of these three files to learn which file is already stored reveals when the attack will occur.

An example of this problem is further illustrated in FIG. 1. As FIG. 1 illustrates, Alice and Bob each have a copy of a public memo. They each also have private copies of an award letter, detailing how many stock options shares each of them have been awarded (as illustrated in this example, 1000 for Alice, and 20 for Bob). Say that Alice saves the private copy of her public memo first. The memo is first divided into chunks A and B based on the content, in this case the header and the body. Alice first sends the hashes of the chunks, H(A) and H(B). The storage system does not have chunks with these hashes, so it asks Alice to send them (this is illustrated as the "send H(A), H(B)" box in FIG. 1). Alice proceeds to send chunks A and B. Bob later stores his copy of the public memo. When he sends hashes of his chunks, H(A) and H(B), the storage system replies that Bob need not send the chunks (this is illustrated as the "got it!" box in FIG. 1). If Alice then stores her private memo, she sends the hashes of the chunks A and C, H(A) and H(C). The storage system replies that it only needs the chunk labeled C, which Alice sends. When Bob later stores his private file, the storage system reports that he need only send the chunk labeled D. Now, if Bob wants to know if anyone received 1,000 option shares, he can create a file with the same content as his private file, replacing 20 with 1,000. If the storage system does not ask for the chunk, Bob knows that someone got 1,000 option shares, which is more than he received. If the private file also contains the recipient's name, Bob can find out who got more options by replacing his name with the names of all his co-workers. If Bob does not have access to the low level protocol, he can time how long it takes to store his guessed chunks.

What is needed are methods, computer readable media and computer systems that preserve the reduced data storage size and reduced data communication bandwidth provided by existing hash based storage systems, yet at the same time provide data privacy which the existing systems lack.

SUMMARY

Methods, computer readable media and computer systems embodiments in accordance with the present invention preserve the benefits provided by existing hash based storage systems, and provide data privacy. Hashes are based on the content of the chunk and a privacy preserving code. When a request to store a chunk of data is received, it is determined whether a chunk associated with the hash has already been stored. In some embodiments, because hashes are based on the unique file identifiers as well as content, chunks of duplicate copies of a file need not be stored multiple times, and yet privacy is preserved for content at a file level. In other embodiments, hashes based on a public identifier as well as the content, and/or hashes based on an identifier of the requesting user as well as the content, are also sent with storage requests. These additional hashes enable more robust transmission and storage efficiency, while still preserving privacy.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
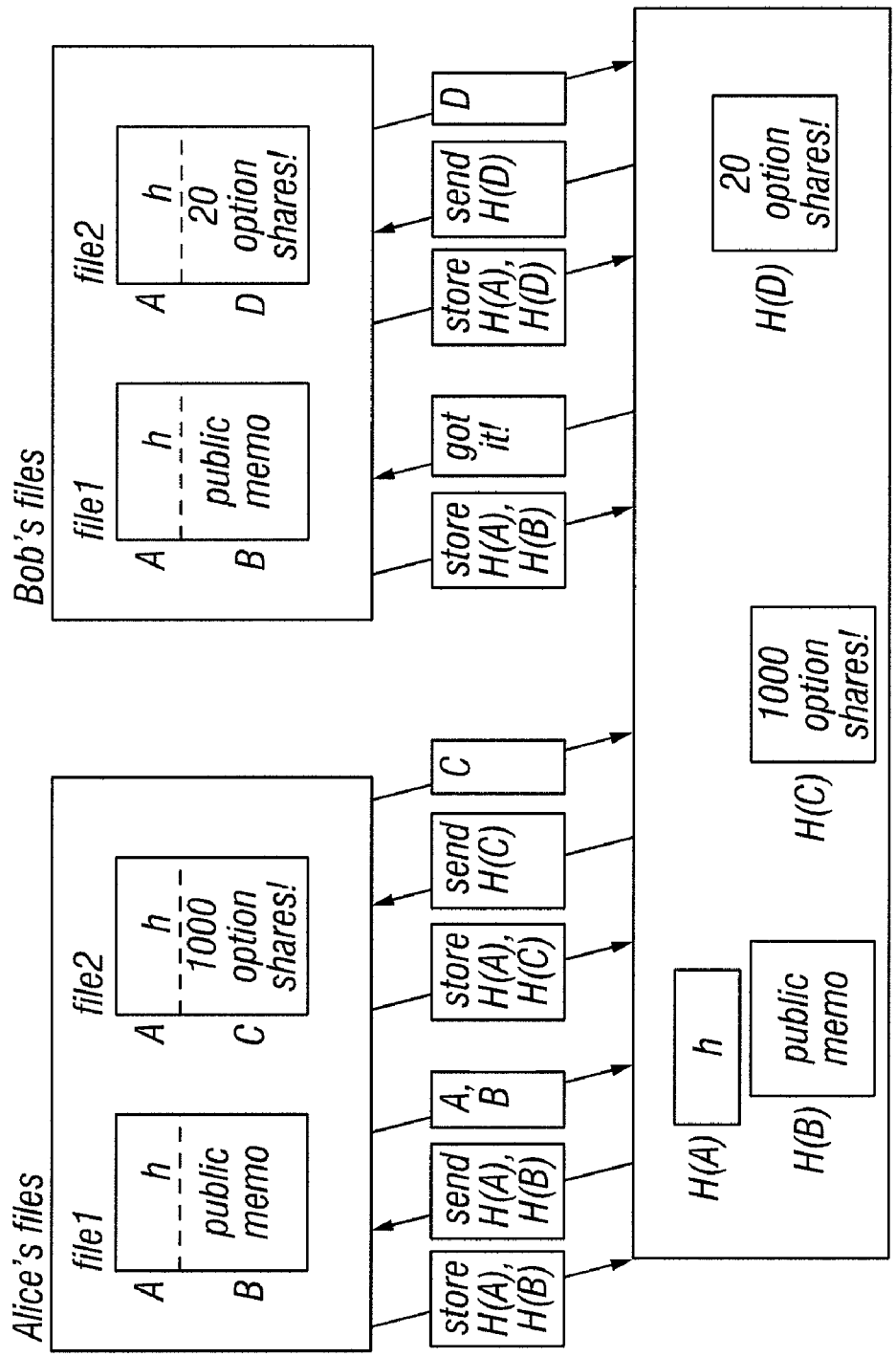
FIG. 1 is a block diagram illustrating a prior, art hash based information storage system.
Figure 2:
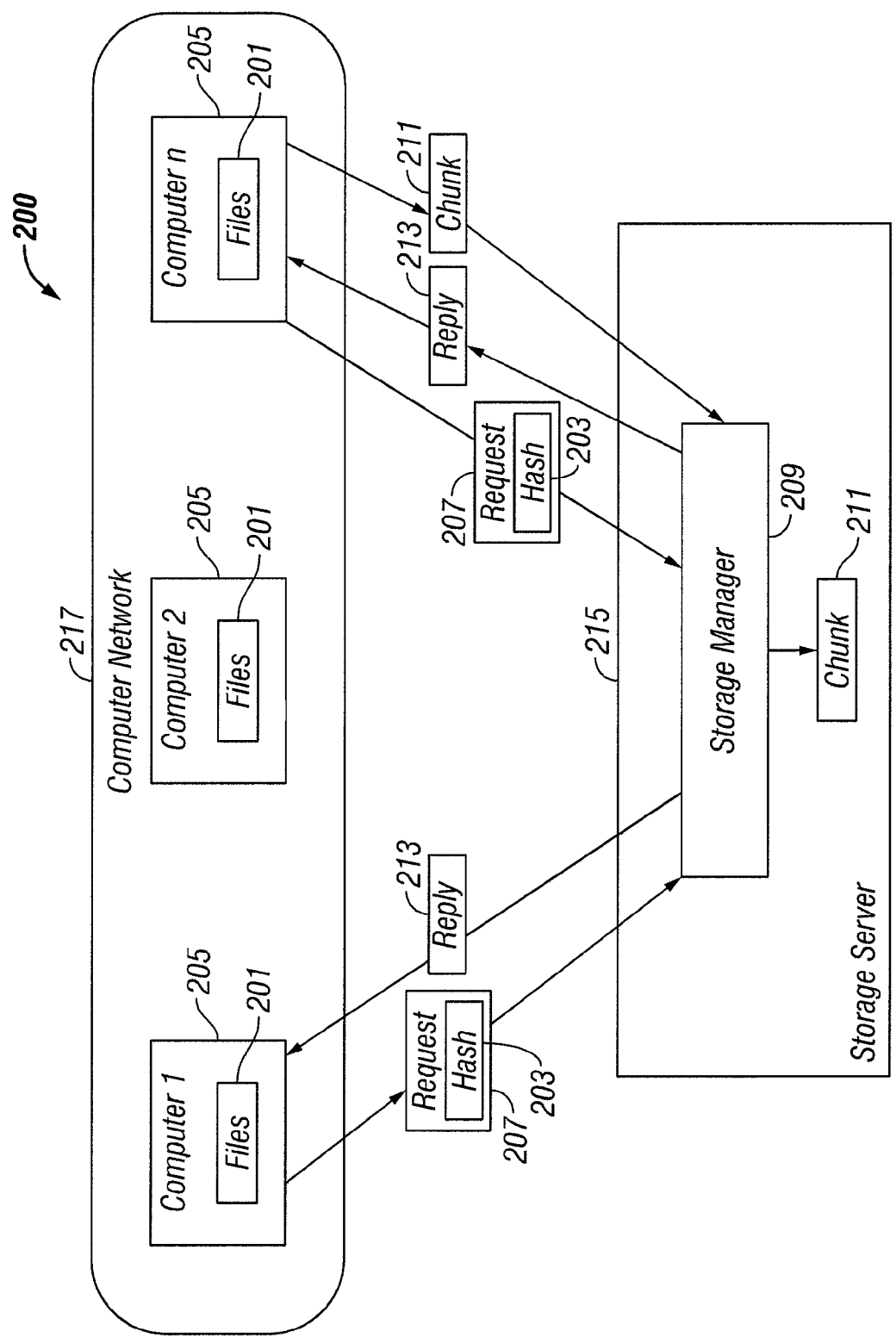
FIG. 2 is a block diagram illustrating a high level overview of a storage system for protecting the privacy of files stored by their hashes, according to some embodiments of the present invention.

FIG. 2 illustrates a storage system 200 for protecting the privacy of files 201 stored by their hashes 203, according to some embodiments of the present invention. As illustrated in FIG. 2, one or more computers 205 make requests 207 to a storage manager 209 to store one or more chunks 211 of files 201 based on their hashes 203 (as described and illustrated below, one or more codes indicating information concerning data are included in the hashes 203 to protect privacy). In response to a request 207, the storage manager 209 sends a reply 213, either requesting the chunk 211, or indicating that the chunk 211 has already been stored. Computers 205 send requested chunks 211 to the storage manager 209, which in turn stores the chunks 211, for example on a storage server 215.

It is to be understood that a storage manager 209 can service a single computer 205, but would more typically service a group or groups of computers 205, such a local or wide area network 217, as illustrated. The storage manager 209 is illustrated as residing on a storage server 215, and storing requested chunks 211 thereon. Of course, the storage manager 209 can run on any computing device, or be distributed among multiple computing devices. The storage manager 209 can also store data on any storage medium or media, in a localized or distributed manner as desired.

It is to be understood that although the storage manager 209 is illustrated in FIG. 2 as a single entity, as used herein the term "storage manager" 209 represents a collection of functionalities which can be implemented as software, hardware, firmware or any combination of these. Where a storage manager 209 is implemented as software, it can be implemented as a standalone program, but can also be implemented in other ways, for example as part of a larger program, as a plurality of separate programs, as a kernel loadable module, as one or more device drivers or as one or more statically or dynamically linked libraries. It is to be understood further that where a storage manager 209 is implemented as software, the associated program code can be stored on one or more computer readable media, such as magnetic or optical disks.

Figure 3:
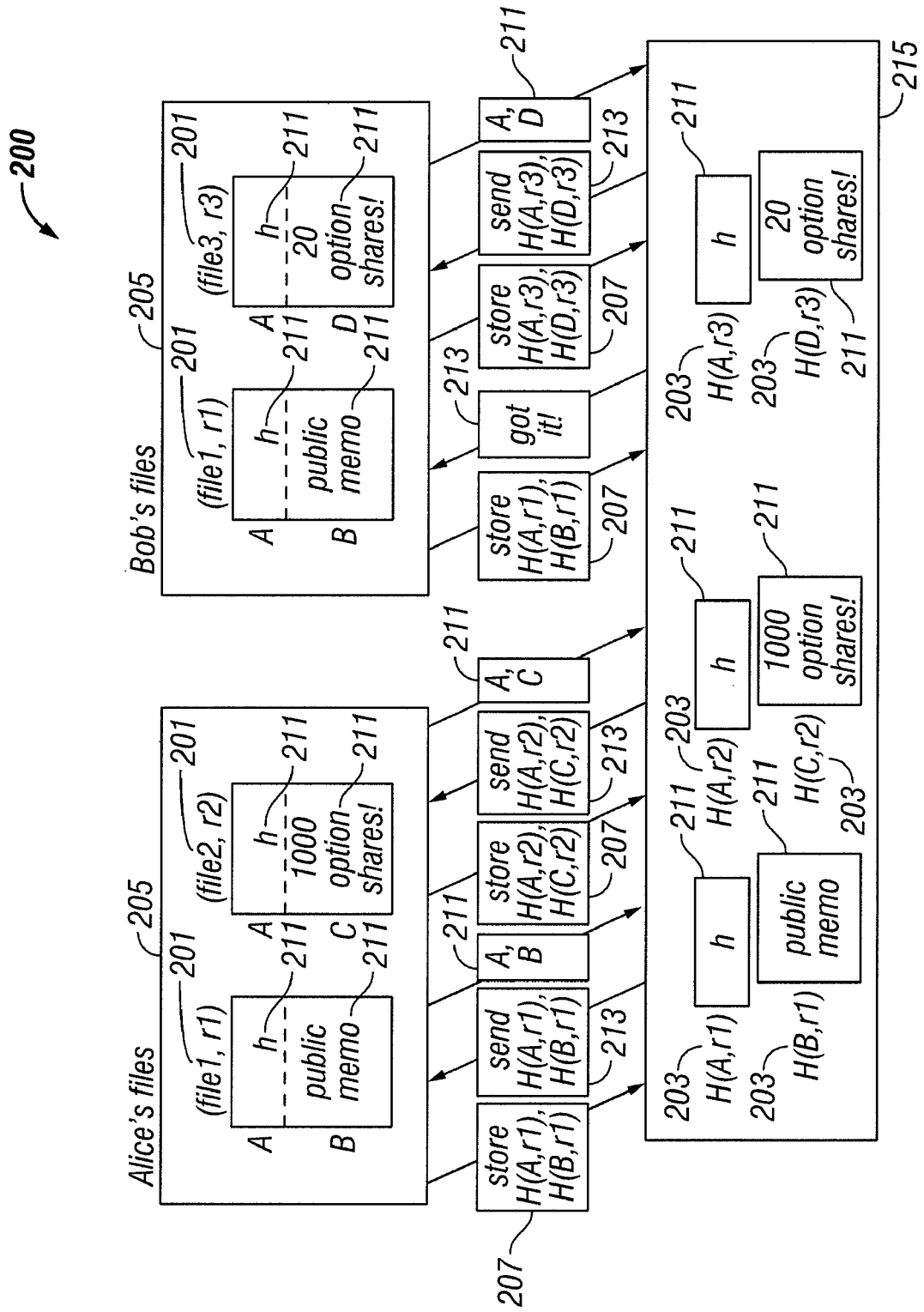
FIG. 3 is a block diagram illustrating an embodiment of the present invention in which a random component is associated with each file, to protect file privacy.
Figure 4:
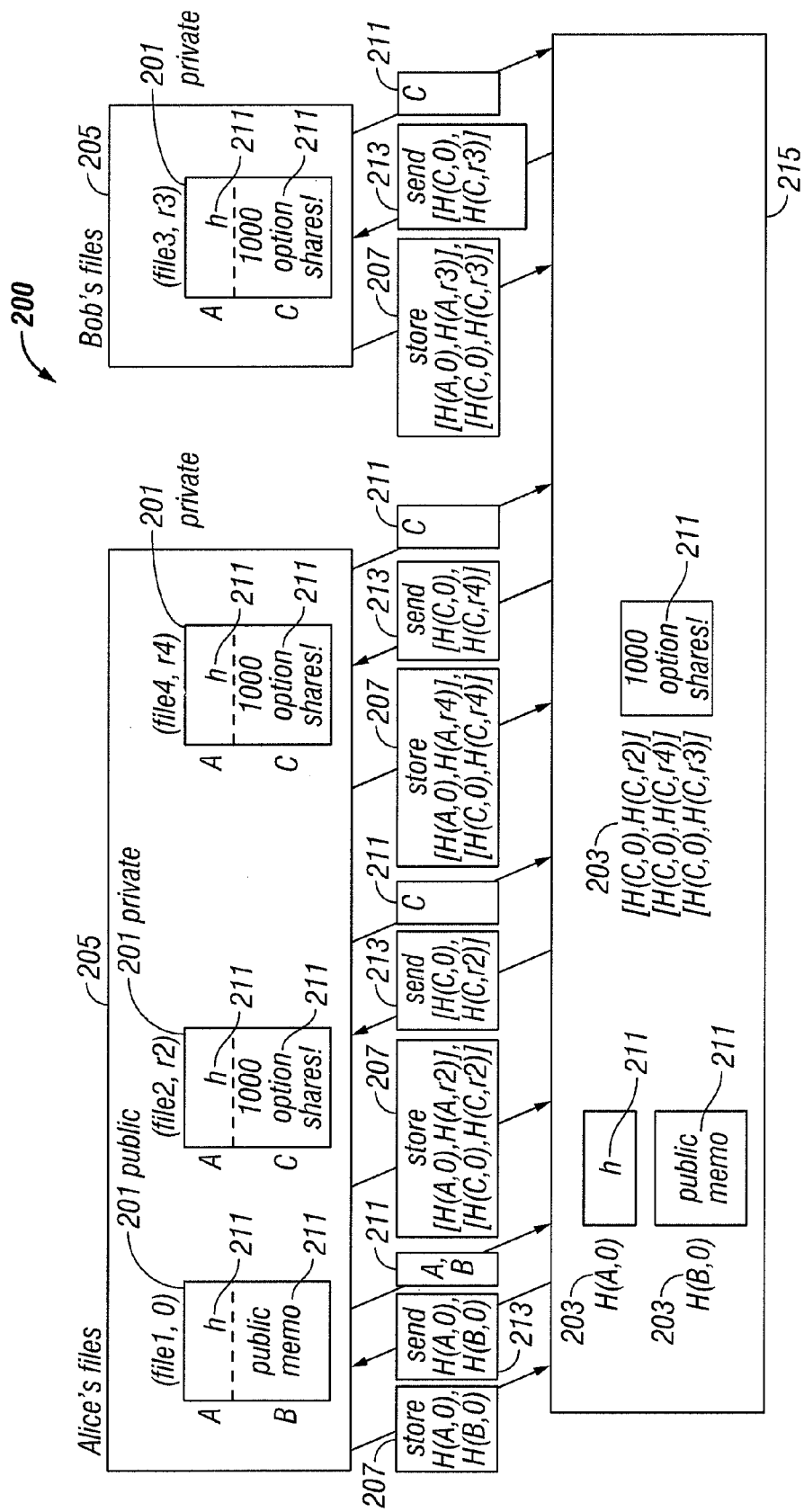
FIG. 4 is a block diagram illustrating an embodiment of the present invention in which a random component is associated with each file and public files are distinguished from private files, to further protect file privacy.
Figure 5:
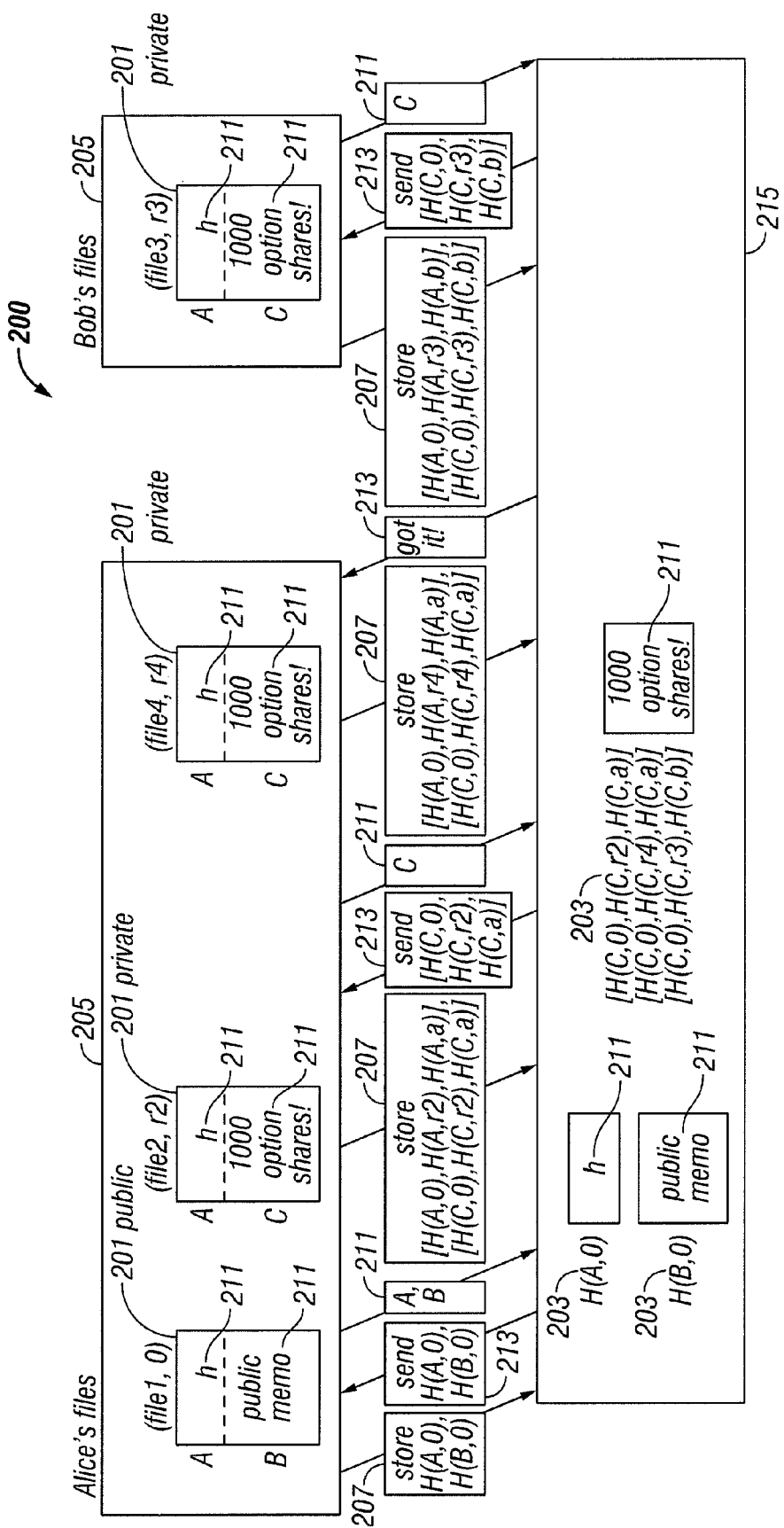
FIG. 5 is a block diagram illustrating an embodiment of the present invention in which a random component is associated with each file, public files are distinguished from private files and a user identifying component is associated with each file, to further protect file privacy.

The examples of FIGS. 3, 4 and 5 illustrate method embodiments of the present invention. The method embodiments are also discussed with reference to the system in FIG. 2 for illustrative purposes and not to be limiting thereof.

Turning now to FIG. 3, in some embodiments of the present invention, the creator of a file (e.g. file management software on any of computers 205) associates an unguessable identifying code (e.g., a random component such as a random number, illustrated as r1, r2 and r3) with each file 201 under the control of the system 200. It is to be understood that the identifying code can be any unique code or indicator such that each file 201 can be uniquely identified. In one embodiment, the random component is stored with the metadata for the file 201 (not illustrated in FIG. 3, but see Table 1). In another embodiment, the random component is incorporated into the filename. This works even under files systems in which the metadata format does not provide a place for the random component. In the latter case, the random component provides a measure of access control because knowledge of the random component is needed to reference the file 201 by name. In the embodiments illustrated in FIG. 3, a hash 203 is based on the content of a chunk 211 of a file 201, and the random component associated with that file 201.

In section a) of Table 1 below, the inode metadata is shown holding the random component and the file contents hash 203 for a file 201 named "MyFile". In Section b), the inode metadata holds the hashes 203 for all of the chunks 211 of the file 201. In Section c), the file name might be used to hold both the random component and the file hash 203. Finally, Section d) shows how the file name might be used to hold the random component and the hashes 203 of all the chunks 211 of the file 201. In the latter two schemes, the system 200 could hide the random component and hash components 203 of the filenames from users. As will be apparent to those of ordinary skill in the relevant art, other approaches of associating random components with files 201 and/or chunks 211 thereof are also possible, and are within the scope of the present invention. As will be apparent to one of ordinary skill in the relevant art, a system that reads and stores files as single units (chunks) without breaking them, up into smaller chunks based on content is within the scope of the present invention.

TABLE 1

| | |
|---|---|
| a) | Inode for file "MyFile" <br> File Contents Hash: 38AF938BC935 <br> Disk block: 3827 <br> Track: 17 <br> Random Number: 9203840872075 |
| b) | Inode for file "MyFile" <br> File Chunk Contents Hashes: 28C3FD72389A, <br> 8BCC20A638E5, . . . <br> Disk block: 3827 <br> Track: 17 <br> Random Number: 9203840872075 |
| c) | Filename: "MyFile.9203840872075.38AF938BC935" <br> (9203840872075 is the random number, 38AF938BC935 is the hash) |
| d) | Filename: <br> "MyFile.9203840872075.28C3FD72389A.8BCC20A638E5., . . . " <br> (9203840872075 is the random number, while 28C3FD72389A, 8BCC20A638E5, . . . , are the chunk hashes) |

In all of these scenarios, the hash values 203 are derived by applying a hash function to both the contents of the file 201 or the chunks 211 thereof, and the associated random component. This is illustrated in FIG. 3, where, for example, Alice sends hashes H(A, r1) and H(B, r1) of chunks A and B of file1, which is associated with random component r1, and hashes H(A, r2) and H(C, r2) of chunks A and C of file2, which is associated with random component r2.

When a computer 205 sends a request 207 to store a chunk 211 associated with a hash 203, the storage manager 209 sends a reply 213 requesting the content itself if the hash 203 does not match that of an already stored chunk 211. Since hashes 203 in this embodiment are a function of the content and the random component associated with the originating file 201, the storage manager 209 only requests chunks 211 where the chunk 211 of the particular file 201 has not yet been stored, regardless of whether the content itself has already been stored as data from another file 201.

Referring to FIG. 3, in some embodiments of the present invention, when a file 201 is created on a computer 205, the program creating the file creates a random component (e.g., r1 or r2 or r3) and associates it with the file 201, as described above. Returning to the example of Bob and Alice (illustrated in FIG. 3), since the public memo is an individual file 201 stored on both Alice's and Bob's computers 205, the random component is the same for both copies of the public memo. Therefore, Bob does not have to send the data to the storage system if Alice stored her copy first. Note that when Bob sends hashes H(A, r1) and H(B, r1) directing storage of the public memo, the storage manager 209 replies that it already has those chunks 211, as represented by the "got it!" box. Since the private memos are separate files 201 and thus have different random components r2 and r3, Bob will have to send his copy of the private memo to the storage system. This will be true even if Bob's private memo file is a correct guess of the contents of Alice's private memo file. Hence, Bob cannot find out if his guess of the contents of Alice's memo is correct.

This embodiment is quite useful, and solves some of the privacy problems of earlier hash based storage systems. However, note that in the earlier systems described in the background art section, chunk A, which is common to the three files 201, is only sent once and only stored once. Although the embodiments of FIG. 3 provide some privacy protection absent in the earlier systems, chunk A is sent three times and stored three times. Also, files 201 from an external source, such as the Internet, do not come into the jurisdiction of the system 200 with a random component associated with them. File management or file requesting software can assign random components to these files 201 when they are loaded onto a computer 205 supported by the storage system 200. However, each such copy of a single file 201 downloaded at different times and/or by different computers 205 will be assigned different random component. Hence, a large number of identical chunks 211 may be redundantly sent to and stored in the storage system 200. Note however that the embodiments illustrated by FIG. 3 still realize some of the data storage and communication efficiencies of the earlier hash based storage systems, while introducing an aspect of data privacy that the earlier systems lack.

FIG. 4 illustrates another embodiment of the present invention. In the embodiment illustrated in FIG. 4, all public files $201_{public}$ are assigned a specific, single public code value (e.g., zero) in place of the random component. It is to be understood that the single code value assigned to each public file $201_{public}$ can be in the form of any unique identifier, and need not be numeric. In many cases, files 201 from external sources such as the Internet, can be considered to be public files $201_{public}$. Chunks of public files $201_{public}$ are described by a hash 203 of the chunk 211 and the public code value (e.g., 0). Chunks 211 of non-public files $201_{private}$ are described by two hash values 203, the first being the hash 203 of the chunk 211 and the public code value, and the second being a hash 203 that includes the random component associated with the specific private file $201_{private}$. For example, chunk A of Alice's filet $201_{private}$ would be described as [H(A,0), H(A, r2)].

In this embodiment, when the storage manager 209 receives a request 207 (see for example "store H(A,0) H(B, 0)") to store a public file, the request 207 includes a single hash 203 for each of the file's chunk 211 based on the public code. The storage manager 209 checks to see if it has already stored data associated with any of the hash values 203, and hence whether it needs to request any of the actual chunks 211. In the case of public memo file1, the storage manager 209 requests (see "send H(A,0), H(B,0)") the data associated with the hashes H(A,0), H(B,0), and the computer 205 sends A,B (See "A,B" box.) On the other hand, when the storage manager 209 receives a request 207 to store a private file, the request 207 includes for each of the file's chunks the two hashes 203. For example, in FIG. 4, the request to store filet includes a hash for each chunk, A and C, of the content and the public code, H(A,0) and H(C,0), and another hash of the content and the unique identifying code, in this example random component r2: H(A,r2) and H(C,r2). Thus, the storage manager 209 can determine for each of the file's chunks a) whether it has already stored this chunk from a public source, and b) whether it has already stored this chunk from a private source that included the same random component into the chunk's hash. Only when neither a) nor b) is the case does the storage manager 209 request the data. For example, the storage manager 209 has already stored the header "h" associated with H(A,0). However, C is not stored, so the request is only for "C" as per the "send [H(C,0),H(C,r2)]" request. The chunk "C" is sent by the computer 205 in response.

Note that in this embodiment, the storage system 200 need only store a single copy of any chunk 211 of data. Furthermore, if a chunk 211 has been stored from a public source, the storage manager 209 need not request additional transfers of that chunk 211, even in response to requests 207 to store the same chunk 211 in the context of a private file $201_{private}$ as shown in the discussion of file1 and file2 above. However, if a chunk 211 has only been stored from a private source, in order to avoid disclosing the private storage of the data, the storage manager 209 responds to a subsequent request 207 to store a duplicate copy of the chunk 211 (one created independently of the first with a different random component) by requesting the data, even though the storage manager 209 does not store the duplicate copy. The example of file4 in FIG. 4 illustrates this point. The computer 205 sends a request to store file4 as indicated by "store [H(A,0), H(A,r4)] [H(C,0), H(C,r4)]." Chunk "C" was already stored during the storage of private file2. However, a request for chunk C is still sent as per "send [H(C,0),H(C,r4)]." The computer 205 sends the data of chunk "C", but the storage manager 209 does not store another copy.

Similarly, when Bob's computer 205 requests storage of file3 ("store [H(A,0),H(A,r3)], [H(C,0), H(C,r3)]") including public header chunk "h" and private chunk "C," a reply 213 back requests "C" ("send [H(C,0), H(C,r3)]"). Bob's computer 205 sends "C" which is not stored by the storage manager 209. Only a single copy need stored as illustrated by "1000 option shares!" associated with the three sets of hashes linking this chunk "C" to file2, file3 and file4. Note that Bob gains no information by pretending that file3 is a public file. The storage system will request chunk C because it has not yet stored a public copy of this chunk.

The scenario with Alice and Bob has been augmented in FIG. 4 to show these additional features. Here, Alice has a second copy of the award letter for the same 1000 shares, perhaps from a previous year. Also, Bob's award is also for 1000 shares. In the Alice and Bob example, only a single copy of chunk A is stored, even though there were four requests 207 to store chunk A. Additionally, the storage manager 209 only requests the transfer of chunk A once. This results from the fact that the first request 207 to store chunk A was for a public copy. Thus, by not requesting the contents of chunk A, no information was conveyed to the subsequent storing users of private copies of chunk A, other than the fact that a public copy exists somewhere on the system 200. In other words, if the storage system 200 can determine that a chunk 211 has been stored as part of a public document, then no vulnerability to loss of data privacy is introduced by not asking for it responsive to subsequent storage requests 207.

Further, only a single copy of chunk C is stored even though three requests 207 to store chunk C were made. Note that despite the fact that only a single copy of chunk C is stored, chunk C was requested for transfer to the storage system 200 three times. Otherwise information would be conveyed to the storing users about the existence of other private copies of chunk C on the system 200. This embodiment duplicates the storage compression advantage of the earlier hash based storage systems, while preserving the data privacy aspects of the invention.

In one embodiment, the storage manager 209 tracks how many attempts have been made to write a given chunk 211 of a public file ($201_{public}$). This is so because every time a public chunk 211 is written, a potentially new association is created between the specified hash values 203 and that file chunk 211. If the hash values 203 are already associated with the file chunk 211, then the storage manager 209 increments its count of attempted writes for that chunk 211. Both public and private writes of a file chunk 211 establish an association of the public hash 203 with the file chunk 211, but only a "public write" increments the count associated with the public hash value 211.

FIG. 5 illustrates another embodiment of the present invention which can be desirable in cases when a single computer user has many files 201 that have a lot of chunks 211 in common, for example with Alice's file2 and file4 as illustrated. This situation can arise, for example, when producing customized letters for different customers. In this embodiment, an additional hash is calculated for each of the file's chunks based on the contents, of each chunk and a code specific or unique to each user. This additional user code hash is conveyed along with the previously described hash based on the random component and content, the random component hash, and the other hash of the public component and content, the public hash, for all private requests to the storage manager 209 for each file chunk. In this embodiment, for each of a file's chunks, the storage manager compares not only the random component hash and public hash, but also the user code hash against the hash values of all stored chunks, as shown in FIG. 5. In the illustrated example, "a" represents the user code associated with Alice, and "b" represents the user code associated with Bob. Of course, these are only examples and any value and/or value type can be used as a user code. Private chunks 211 are thus referred to by up to three hashes 203, as in for example [H(C,0), H(C,r2), H(C,a)]. The storage manager 209 compares not only the public hash 203 and the random component incorporating hash 203, but also the user specific code incorporating hash 203 against the hashes 203 of each stored chunk 211. If either the random component incorporating hash or the user specific code incorporating hash matches, or if the public hash matches and the file chunk has been stored as a public file based only on the public hash, the chunk 211 need not be transferred. As illustrated in FIG. 5, no matter how many copies of chunk C Alice has on her computer 205, she need transmit it to the storage system 200 only once, since along with each storage request of chunk C, Alice provides an identical user code hash H(C,a). The same storage system behavior applies to Bob, although as shown, the existence of Alice's private chunk C is not revealed to Bob from the behavior of the storage system 200.

Walking through FIG. 5, Alice's computer 205 first sends a request 207 to store public chunks A and B of public file1, as represented by the "store H(A,0), H(B,0)" box. This request 207 includes a single hash 203 for each of the file's chunks 211 based on the public code. The storage manager 209 checks to see if it has already stored data associated with any of the hash values 203, and determines that it has not. Thus, the storage manager 209 replies 213 that Alice should send the data associated with the hashes H(A,0) and H(B,0), as represented by the "send H(A,0), H(B,0)" box. Alice's computer 205 then sends chunks A and B (see the "A, B" box.)

Alice's computer 205 next requests 207 that the storage manager 209 store chunks A and C of private file2. This request 207 includes three hashes 203 per chunk 211, one based on the public identifier, one based on the file identifier and one based on the user identifier. This request 207 is represented by the "store [H(A,0), H(A,r2), H(A,a)], [H(C,0), H(C,r2), H(C,a)]" box. The storage manager 209 compares not only the public hash 203 and the random component incorporating hash 203, but also the user specific code incorporating hash 203 against the hashes 203 of each stored chunk 211. In this case, the storage manager 209 already has chunk A from a public source but does not have chunk C at all, and thus in a reply 213 back to Alice's computer 205 asks for the data associated with hash [H(C,0), H(C,r2), H(C,a)] (see the "send [H(C,0), H(C,r2), H(C,a)]" box). Accordingly, Alice's computer 205 sends chunks C for storage, as depicted by the "C" box.

Next, Alice's computer 205 sends a request 207 to store chunks A and C of private file4 (see the "store [H(A,0), H(A,r4), H(A,a)], [H(C,0), H(C,r4), H(C,a)]" box). The storage manager 209 checks the sent hashes 211 against the hashes 211 of its stored data, and determines that it already has stored a public copy of chunk A, and a private copy of chunk C from the requesting user, Alice. Therefore, it replies 213 that Alice's computer need not send any data, as depicted by the "got it!" box.

When Bob's computer 205 requests 207 the storage of chunks A and C of private file3, he sends a request 207 comprising three hashes per chunk 211, "store [H(A,0), H(A,r3), H(A,b)], [H(C,0), H(C,r3), H(C,b)]." The storage manager 209 determines it already has chunk A from a public source so it need not have Bob resend it. However, because the storage manager has only stored a private copy of chunk C from another user, the manager 209 replies 213 to Bob's computer 205 requesting that it send over the data associated with hash [H(C,0), H(C,r3), H(C,b)] ("send [H(C,0), H(C,r3), H(C,b)]"). This is so that Bob is not informed that someone else has already stored that private data. Bob's computer 205 then sends chunk C (see the "C" box), which the storage manager 209 receives but does not store.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present, invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for protecting privacy of stored file content where said file content is referenced by hash values, the method comprising:
   receiving via a programmable computing device at least one request to store a public chunk of data in memory, the request comprising a hash value based on the chunk of data and on a public code value associated with a public file comprising the chunk of data;
   determining via the programmable computing device whether a chunk of data associated with the received hash value has already been stored, and additionally determining whether the chunk of data associated with the received hash value has been stored by a request to store a public chunk of data; and
   performing via the programmable computing device:
      responsive to determining that a chunk of data associated with the received hash value has already been stored by a request to store a public chunk of data, not requesting the chunk of data;
      responsive to determining that a chunk of data associated with the received hash value has already been stored and determining that no chunk of data associated with the received hash value has already been stored by a request to store a public chunk of data, requesting but not storing the chunk of data;
      responsive to determining that no chunk of data associated with the received hash value has already been stored, requesting, receiving and storing the chunk of data; and
      associating the chunk of data with the received hash value.

2. The method of claim 1 further comprising:
   receiving via the programmable computing device at least one request to store a private chunk of data in the memory, the request comprising a first hash value based on the chunk of data and the public code value, and a second hash value based on the chunk of data and a code identifying a file comprising at least the chunk of data;
   determining via the programmable computing device whether a chunk of data associated with the first received hash value has already been stored, and additionally determining whether the chunk of data associated with the first received hash value has been stored by a request to store a public chunk of data;
   determining via the programmable computing device whether a chunk of data associated with the second received hash value has already been stored; and
   performing via the programmable computing device:
      responsive to determining that a chunk of data associated with the first received hash value has already been stored by a request to store a public chunk of data, not requesting the chunk of data;
      responsive to determining that a chunk of data associated with the second received hash value has already been stored, not requesting the chunk of data;
      responsive to determining that a chunk of data associated with the first received hash value has already been stored and determining that no chunk of data associated with the second received hash value has already been stored, requesting, receiving but not storing the chunk of data in the memory;
      responsive to determining that no chunk of data associated with the first or the second received hash value has already been stored, requesting, receiving and storing the chunk of data;
      associating the chunk of data with the first received hash value; and
      associating the chunk of data with the second received hash value.

3. The method of claim 2 further comprising:
   associating via the programmable computing device each of a plurality of public files with a single public code value, and associating each of plurality of private files with a unique code, each unique code identifying that file.

4. The method of claim 1 further comprising:
   receiving via the programmable computing device at least one request to store a private chunk of data in the memory, the request comprising a first hash value based on the chunk of data and the public code value, a second hash value based on the chunk of data and a code identifying a file comprising at least the chunk of data, and a third hash value based on the chunk of data and a code identifying a user;
   determining via the programmable computing device whether a chunk of data associated with the first received hash value has already been stored, and additionally determining whether the chunk of data associated with the first received hash value has been stored by a request to store a public chunk of data;
   determining via the programmable computing device whether a chunk of data associated with the second received hash value has already been stored;
   determining via the programmable computing device whether a chunk of data associated with the third received hash value has already been stored; and
   performing via the programmable computing device:
      responsive to determining that a chunk of data associated with the first received hash value has already been stored by a request to store a public chunk of data, not requesting the chunk of data;
      responsive to determining that a chunk of data associated with the second or the third received hash value has already been stored, not requesting the chunk of data;
      responsive to determining that a chunk of data associated with the first received hash value has already been stored, and determining that no chunk of data associated with either the second or the third received hash value has already been stored, requesting, receiving but not storing the chunk of data;

responsive to determining that no chunk of data associated with the first, second or third received hash value has already been stored, requesting, receiving and storing the chunk of data;

associating the chunk of data with the first received hash value;

associating the chunk of data with the second received hash value; and associating the chunk of data with the third received hash value.

5. The method of claim 4 further comprising:
associating via the programmable computing device each of a plurality of public files with a single public code value, associating each of plurality of private files with a unique code, each unique code identifying that file, and associating each user with a unique user code.

6. At least one non-transitory computer readable medium containing a computer program product executable by a programmable computing device for protecting privacy of stored file content where said file content is referenced by hash values, the computer program product comprising:

program code for receiving at least one request to store a public chunk of data, the request comprising a single hash value based on the chunk of data and a public code value;

program code for determining whether a chunk of data associated with the received hash value has already been stored, and additionally determining whether the chunk of data associated with the received hash value has been stored by a request to store a public chunk of data; and program code for performing at least one step from a group of steps consisting of:

responsive to determining that a chunk of data associated with the received hash value has already been stored by a request to store a public chunk of data, not requesting the chunk of data;

responsive to determining that a chunk of data associated with the received hash value has already been stored and determining that no chunk of data associated with the received hash value has already been stored by a request to store a public chunk of data, requesting but not storing the chunk of data;

responsive to determining that no chunk of data associated with the received hash value has already been stored, requesting, receiving and storing the chunk of data; and associating the chunk of data with the received hash value.

7. The computer program product of claim 6 further comprising:

program code for receiving at least one request to store a private chunk of data, the request comprising a first hash value based on the chunk of data and the public code value, and a second hash value based on the chunk of data and a code identifying a file comprising at least the chunk of data;

program code for determining whether a chunk of data associated with the first received hash value has already been stored, and additionally determining whether the chunk of data associated with the first received hash value has been stored by a request to store a public chunk of data;

program code for determining whether a chunk of data associated with the second received hash value has already been stored; and program code for performing at least one step from a group of steps consisting of:

responsive to determining that a chunk of data associated with the first hash value has already been stored by a request to store a public chunk of data, not requesting the chunk of data;

responsive to determining that a chunk of data associated with the first received hash value has already been stored and determining that no chunk of data associated with the second received hash value has already been stored, requesting, receiving but not storing the chunk of data;

responsive to determining that no chunk of data associated with the first or the second hash value has already been stored, requesting, receiving and storing the chunk of data;

associating the chunk of data with the first received hash value; and associating the chunk of data with the second received hash value.

8. The computer program product of claim 7 further comprising:

program code for associating each of a plurality of public files with a single public code value, and associating each of plurality of private files with a unique code, each unique code identifying that file.

9. The computer program product of claim 6 further comprising:

program code for receiving at least one request to store a private chunk of data, the request comprising a first hash value based on the chunk of data and the public code value, a second hash value based on the chunk of data and a code identifying a file comprising at least the chunk of data, and a third hash value based on the chunk of data and a code identifying a user;

program code for determining whether a chunk of data associated with the first received hash value has already been stored and additionally determining whether the chunk of data associated with the first received hash value has been stored by a request to store a public chunk of data;

program code for determining whether a chunk of data associated with the second received hash value has already been stored;

program code for determining whether a chunk of data associated with the third received hash value has already been stored; and program code for performing at least one step from a group of steps consisting of:

responsive to determining that a chunk of data associated with the first received hash value has already been stored by a request to store a public chunk of data, not requesting the chunk of data;

responsive to determining that a chunk of data associated with the second or third received hash value has already been stored, not requesting the chunk of data;

responsive to determining that a chunk of data associated with the second or the third received hash value has already been stored, not requesting the chunk of data;

responsive to determining that a chunk of data associated with the first received hash value has already been stored, and determining that no chunk of data associated with either the second or the third received hash value has already been stored, requesting, receiving but not storing the chunk of data;

13 responsive to determining that no chunk of data associated with the first, second or third hash value has already been stored, requesting, receiving and storing the chunk of data;

associating the chunk of data with the first received hash value;

associating the chunk of data with the second received hash value; and associating the chunk of data with the third received hash value.

10. The computer program product of claim 9 further comprising:

program code for associating each of a plurality of public files with a single public code value, associating each of plurality of private files with a unique code, each unique code identifying that file, and associating each user with a unique user code.

11. A computer system for protecting privacy of stored file content where said file content is referenced by hash values, the computer system comprising:

a processor; and a memory having code stored therein, the code executable by the processor to implement:

receiving at least one request to store a public chunk of data, the request comprising a hash value based on the chunk of data and on a public code associated with a public file comprising the chunk of data;

determining whether a chunk of data associated with the received hash value has already been stored, and additionally determining whether the chunk of data associated with the received hash value has been stored by a request to store a public chunk of data; and responsive to determining that a chunk of data associated with the received hash value has already been stored by a request to store a public chunk of data, not requesting the chunk of data;

responsive to determining that a chunk of data associated with the received hash value has already been stored and determining that no chunk of data associated with the received hash value has already been stored by a request to store a public chunk of data, requesting but not storing the chunk of data; and responsive to determining that no chunk of data associated with the received hash value has already been stored, requesting, receiving and storing the chunk of data; and associating the chunk of data with the received hash value.

12. The computer system of claim 11, the code stored in the memory and executable by the processor to implement:

receiving at least one request to store a private chunk of data in memory, the request comprising a first hash value based on the chunk of data and the public code value, and a second hash value based on the chunk of data and a code identifying a file comprising at least the chunk of data;

determining whether a chunk of data associated with the first received hash value has already been stored, and

14 additionally determining whether the chunk of data associated with the first received hash value has been stored by a request to store a public chunk of data;

determining whether a chunk of data associated with the second received hash value has already been stored; and responsive to determining that a chunk of data associated with the first received hash value has already been stored by a request to store a public chunk of data, not requesting the chunk of data;

responsive to determining that a chunk of data associated with the second received hash value has already been stored, not requesting the chunk of data;

responsive to determining that a chunk of data associated with the first received hash value has already been stored and determining that no chunk of data associated with the second received hash value has already been stored, requesting, receiving but not storing the chunk of data; and responsive to determining that no chunk of data associated with the first or the second received hash value has already been stored, requesting, receiving and storing the chunk of data.

13. The computer system of claim 11, the code stored in the memory and executable by the processor to implement:

receiving at least one request to store a private chunk of data in memory, the request comprising a first hash value based on the chunk of data and the public code value, a second hash value based on the chunk of data and a code identifying a file comprising at least the chunk of data, and a third hash value based on the chunk of data and a code identifying a user;

determining whether a chunk of data associated with the first received hash value has already been stored, and additionally determining whether the chunk of data associated with the first received hash value has been stored by a request to store a public chunk of data;

determining whether a chunk of data associated with the second received hash value has already been stored;

determining whether a chunk of data associated with the third received hash value has already been stored;

responsive to determining that a chunk of data associated with the first received hash value has already been stored by a request to store a public chunk of data, not requesting the chunk of data;

responsive to determining that a chunk of data associated with the second or the third received hash value has already been stored, not requesting the chunk of data;

responsive to determining that a chunk of data associated with the first received hash value has already been stored, and determining that no chunk of data associated with either the second or the third received hash value has already been stored, requesting, receiving but not storing the chunk of data; and responsive to determining that no chunk of data associated with the first, second or third received hash value has already been stored, requesting, receiving and storing the chunk of data.

* * * * *